United States Patent
Sayyed et al.

(10) Patent No.: US 12,210,881 B2
(45) Date of Patent: Jan. 28, 2025

(54) INTELLIGENT OFFLOAD OF MEMORY INTENSIVE LOG DATA

(71) Applicant: Dell Products L.P., Round Rock, TX (US)

(72) Inventors: Ibrahim Sayyed, Georgetown, TX (US); Adolfo S. Montero, Pflugerville, TX (US); Bassem Elazzami, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 17/972,332

(22) Filed: Oct. 24, 2022

(65) Prior Publication Data

US 2024/0134653 A1 Apr. 25, 2024
US 2024/0231836 A9 Jul. 11, 2024

(51) Int. Cl.
*G06F 9/4401* (2018.01)

(52) U.S. Cl.
CPC .......... *G06F 9/4411* (2013.01); *G06F 9/4406* (2013.01)

(58) Field of Classification Search
CPC .............................. G06F 9/4411; G06F 9/4406
See application file for complete search history.

(56) References Cited

U.S. PATENT DOCUMENTS

| | | | |
|---|---|---|---|
| 2010/0005286 A1* | 1/2010 | Wang | G06F 9/4406 717/174 |
| 2012/0011393 A1* | 1/2012 | Roberts | G06F 11/1417 711/E12.078 |
| 2015/0033002 A1* | 1/2015 | Cordero | G06F 9/45558 713/1 |
| 2015/0324137 A1* | 11/2015 | Wu | G06F 12/08 713/2 |
| 2017/0052854 A1* | 2/2017 | Yang | G06F 9/4401 |
| 2018/0074884 A1* | 3/2018 | Cady | G06F 11/0787 |
| 2019/0278651 A1* | 9/2019 | Thornley | G06F 11/0787 |
| 2020/0202004 A1* | 6/2020 | Montero | G06F 21/602 |
| 2020/0341746 A1* | 10/2020 | Mehra | G06F 8/658 |
| 2020/0371859 A1* | 11/2020 | Sayyed | G06F 8/65 |
| 2023/0185855 A1* | 6/2023 | Seshadri | G06F 16/90335 707/769 |
| 2023/0280721 A1* | 9/2023 | Gritzer | G05B 19/4183 700/28 |

* cited by examiner

*Primary Examiner* — Aurel Prifti
(74) *Attorney, Agent, or Firm* — Jackson Walker L.L.P.

(57) ABSTRACT

An embedded controller (EC) of an information handling system is configured to detect and respond to anomalous conditions in which a pre-boot or runtime error has occurred and EC-local storage resources are not sufficient to store EC telemetry data, by redirecting the EC telemetry data through an available communication channel, e.g., SBIOS MBOX packets or ACPI MMIO, to offload the data to EC-external storage such as an ESP partition or Cloud storage. In a pre-boot mode, SBIOS may invoke a UEFI storage driver to write out EC log data to EC-external storage, e.g., SSD/NVMe device or the Cloud. In a runtime mode, the EC may be flagged by an OS bugcheck handler, e.g., via eSPI MMIO path, to save the log data. In an OS-context mode, ACPI methods may notify a persistent driver, e.g., Common Platform Services (CPS) driver, to write out the log to the EC-external storage.

8 Claims, 4 Drawing Sheets

INTELLIGENT OFFLOAD OF MEMORY INTENSIVE LOG DATA

TECHNICAL FIELD

The present disclosure relates to information handling systems and, more specifically, identifying and resolving information handling system errors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are generally provisioned with hardware components for performing workload applications. These hardware components typically include one or more central processing units (CPUs), a system memory, and input/output (I/O) resources including persistent storage devices and network interface devices. In addition, some types of information handling systems including, without limitation, laptop systems, tablets, smart phones, and other mobile systems, may include an embedded controller device, referred to herein simply as the embedded controller (EC), that provides or supports various system management functions including, without limitation, thermal management functions, power monitoring functions, battery management functions, and so forth. If the information handling system includes an ACPI-compliant operating system (OS), the EC may also provide status and notifications regarding power management events.

An EC typically has a limited amount of on-board memory and, when not in a Root of Trust (RoT) mode, the EC may be able to access only a small portion, e.g., 2 KB, of the system's Serial Peripheral Interface (SPI) flash or other non-volatile (NV) storage. Nevertheless, there may be numerous situations in which the EC may collect a potentially large amount of log data. For example, when a system provisioned with an EC is unable to boot a host OS, the EC may collect telemetry data in the Pre-OS path. As another example, when a blue screen of death (BSOD) fault occurs in a runtime context, the EC needs to collect hardware level data for root cause analysis. As yet another example, the absence of a system side OS driver may, in some instances, render the system unable to retrieve log data from the EC and store EC log data into OS-accessible NV storage, e.g., a solid state drive (SSD), or upload EC log data to the cloud.

SUMMARY

In accordance with teachings disclosed herein, issues and challenges described in the preceding discuss are addressed with by intelligent features for offloading memory intensive EC log data.

Generally, the EC, in accordance with disclosed teachings is configured to detect anomalous situations, in which EC-accessible storage resources are too small for event logging, and redirect the data through an available communication channel, e.g., system basic input/output system (SBIOS) mail box (MBOX) packets or Advanced Configuration and Power Interface (ACPI) memory-mapped I/O (MMIO), to directly offload the data to EC-external storage such as an Extensible firmware interface (EFI) system parathion (ESP) on a solid state drive (SSD) or hard disk drive (HDD) or to a Cloud storage resource. In pre-boot mode, SBIOS may invoke a universal EFI (UEFI) storage driver to write out EC log data to the EC-external storage, e.g., SSD/NVMe device or the Cloud, depending on availability. In a runtime mode, the EC may be flagged by an OS bugcheck handler, e.g., via eSPI MMIO path, to save the log data. In an OS-context mode, ACPI methods may notify a persistent driver, e.g., Common Platform Services (CPS) driver, to write out the log to the EC-external storage.

In one aspect, a disclosed information handling system includes a central processing unit (CPU), a system memory, accessible to the CPU; and an EC, communicatively coupled to the CPU. The EC includes EC memory including executable instructions that, when executed by the EC, cause the EC to perform intelligent operations for offloading EC telemetry data. The offloading operations include recording telemetry data responsive to detecting an anomalous event, determining that a capacity of EC-local and/or EC-accessible storage is insufficient to record all of the telemetry data, and, in response, redirecting the telemetry data to an EC-external data store such as an HDD or SSD of a host system or a cloud based storage resource. In at least some embodiments, the EC communicates with the CPU and/or a chip set associated with the CPU, by way of an eSPI bus.

The anomalous event that may trigger offloading of EC telemetry data may include one or more pre-boot errors and one or more runtime errors. The preboot errors may include BIOS no-video errors and BIOS no-boot errors as explained in the detailed description.

In the case of a BIOS no-video error, redirecting the telemetry data may include pushing the telemetry data to a Pre EFI initialization (PEI) service as a plurality of MBOX packets. In the case of a BIOS no-boot error, redirecting the telemetry data may include pushing the telemetry data to a UEFI PEI service as a plurality of MBOX packets, instrumenting the PEI SVC to send the MBOX packets to a UEFI driver execution environment (DXE) startup service via a hand off block (HOB), assembling an HOB list containing telemetry data content, and offloading the telemetry data content with a UEFI DXE storage driver.

The runtime anomalous errors may include stop errors or BSOD errors, in which case the operations may include flagging the EC, e.g., with a bugcheck handler of the OS, via an eSPI-MMIO channel and storing, by the EC, hardware context root cause data to persistent storage. During a subsequent boot sequence, a BIOS boot process is configured to pull data from the EC and offload the data to EC-external storage, e.g., an EFI system partition (ESP) or cloud storage.

The runtime anomalous errors may include runtime original equipment manufacturer (OEM)-driver error in which an OEM-specific driver, e.g., a unified telemetry service driver, has been uninstalled by the end user or the end user has installed a clean OS image. In such situations, directing the telemetry data may include directing the telemetry data via an ACPI runtime method, e.g., an eSPI-MMIO path.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
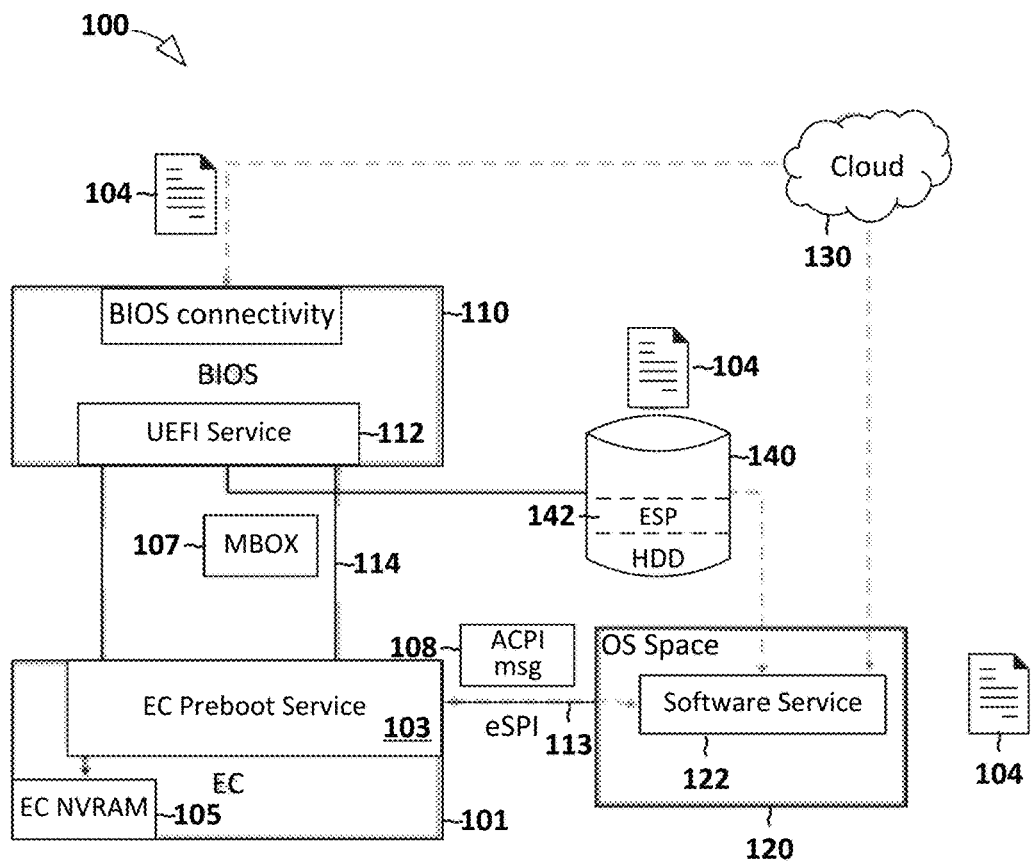
FIG. 1 illustrates connectivity paths for an EC within an information handling system in accordance with disclosed teachings.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates exemplary connectivity paths 100 enabling intelligent offloading of EC log data 104 in either a preboot or runtime context when EC-local storage capacity is insufficient. As depicted in FIG. 1, an EC 101 includes an EC preboot service 103 and EC-local persistent storage in the form of EC non-volatile random access memory (NVRAM) 105, which may be used by EC 101 to store, as a non-limiting example, critical forensic data.

In at least one embodiment, EV preboot service 103 pulls data from EC NVRAM 105 and formats the data for delivery in accordance with an appropriate protocol and interconnect. FIG. 1 illustrates EC preboot service 103 communicating EC log data, formatted as MBOX messages 107, to a UEFI service 112 of BIOS 110 via memory mapped I/O bus 114.

FIG. 1 further illustrates EC 101 communicating EC log data, formatted as an ACPI message 108, to a platform software service 122 in OS space 120 via an eSPI channel 113. In at least one embodiment, upon receiving notification from EC 101, software service 122 fetches data from EC 101 and pushes it either to the Cloud 130 or to an administratively protected partition, identified as extensible firmware interface (EFI) system partition (ESP) 142, within a hard disk drive (HDD) 140. In at least some instances, delivery of EC log data to ESP 142 may be subject to a determination of sufficient available storage within ESP 142. In at least some embodiments, data may be saved to HDD 140 via ACPI messaging (e.g. Host EC data as JavaScript object notation (JSON) files on directory /OEM/EC_data.JSON.

Figure 2:
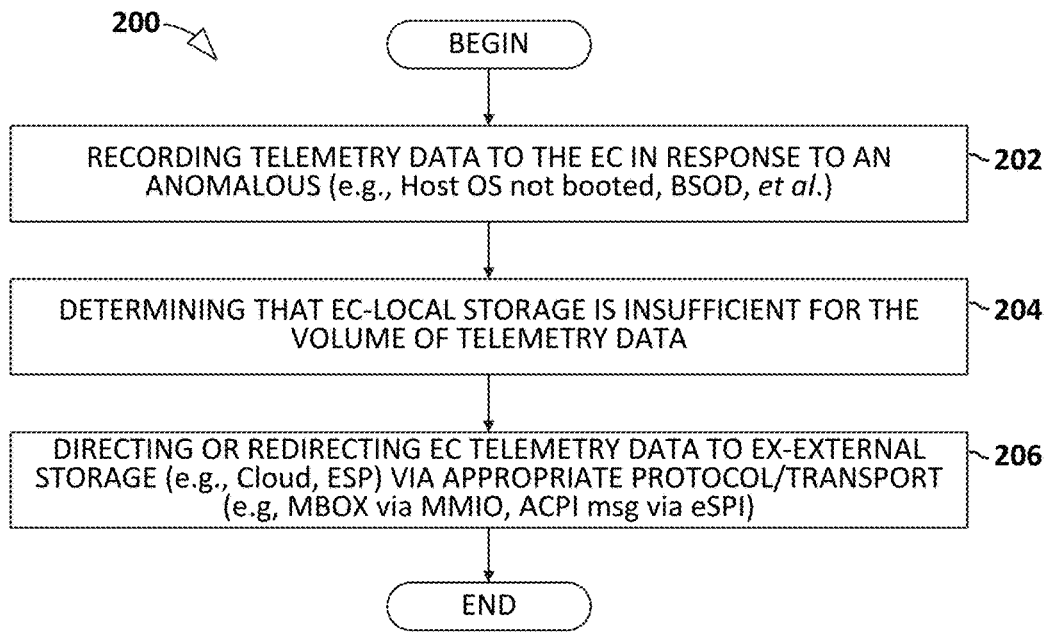
FIG. 2 illustrates a flow diagram of a method for offloading EC log data in accordance with disclosed teachings.

Referring now to FIG. 2, a flow diagram illustrates an exemplary method 200 for intelligent offloading telemetry data, event logs, and the like from an EC of an information handling system. As depicted in FIG. 2, the illustrated method 200 includes an operation 202 during which telemetry data is received and recorded by the EC. In some instances, telemetry data may be sent to the EC in response to an anomalous event or condition of the host system. Exemplary anomalous events that may trigger the intelligent offloading of EC data are described in more detail in FIGS. 3, 4, and 5.

As depicted in FIG. 2, method 200 includes determining (operation 204) that memory and/or storage resources of or local to the EC lack sufficient capacity to store all of the EC data. In some implementations, the determination of insufficient capacity may correspond to a specified threshold of total EC-local storage capacity being allocated or otherwise unavailable. Following the determination of insufficient EC-local capacity, the method 200 illustrated in FIG. 2 directs or re-directs (operation 206) EC telemetry data to an EC-external storage resource such as a cloud-based storage resource or host-resident storage such as an administratively protected partition of an HDD, SSD, flash memory device, or another suitable storage resource. In at least some instances, the delivery of data from the EC may occur using a protocol and transport appropriate for the state or context of the host system when the anomalous condition occurs. As a non-limiting example, in a pre-bot context, EC data may be sent to BIOS-accessible storage using MBOX packets transmitted via a memory mapped I/O bus. In an OS or runtime context, the anomalous condition might be the occurrence of a stop error sometimes referred to as a BSOD error, EC telemetry data may be delivered via ACPI-compliant messaging delivered over an eSPI channel. Moreover, although FIG. 2 has been described using exemplary messaging and transport formats and protocols, those of ordinary skill in the field will recognize that other formats and protocols for transmitting EC telemetry data may be employed.

Figure 3:
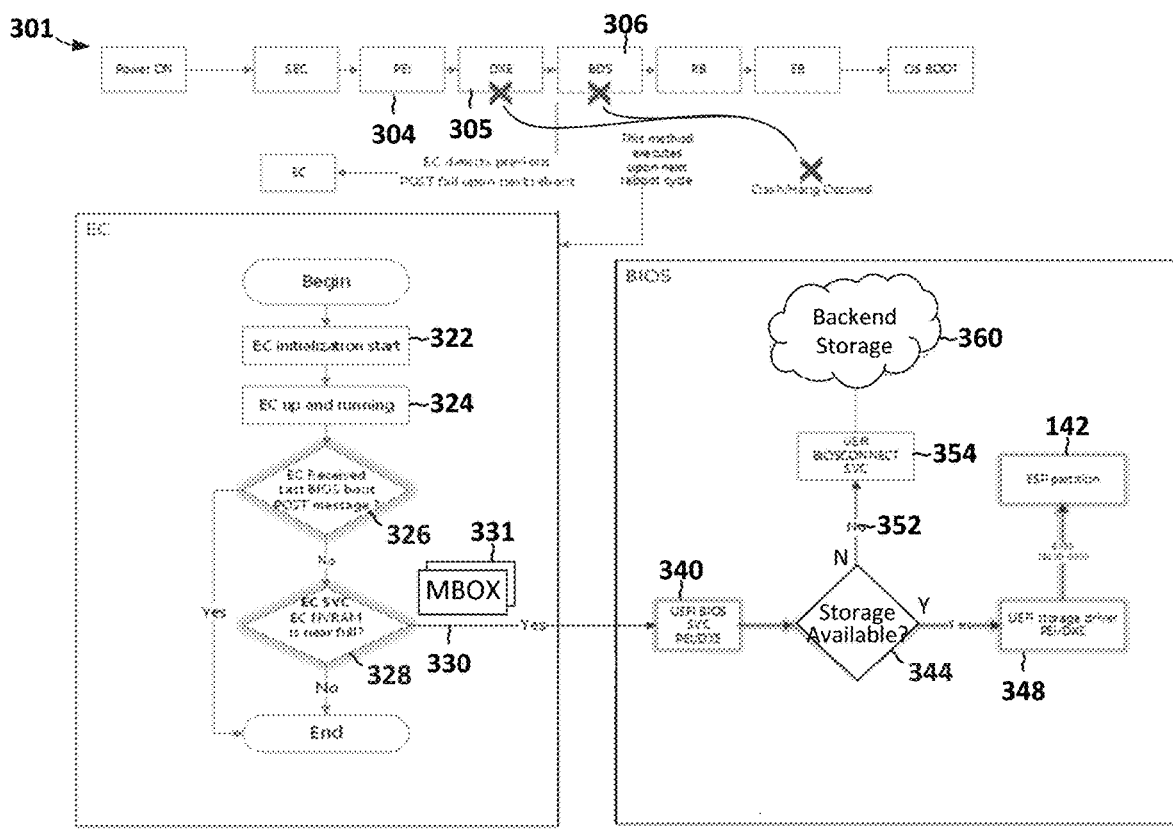
FIGS. 3-5 illustrate first, second, and third examples, respectively, of EC log data offloading in accordance with disclosed teachings.
Figure 4:
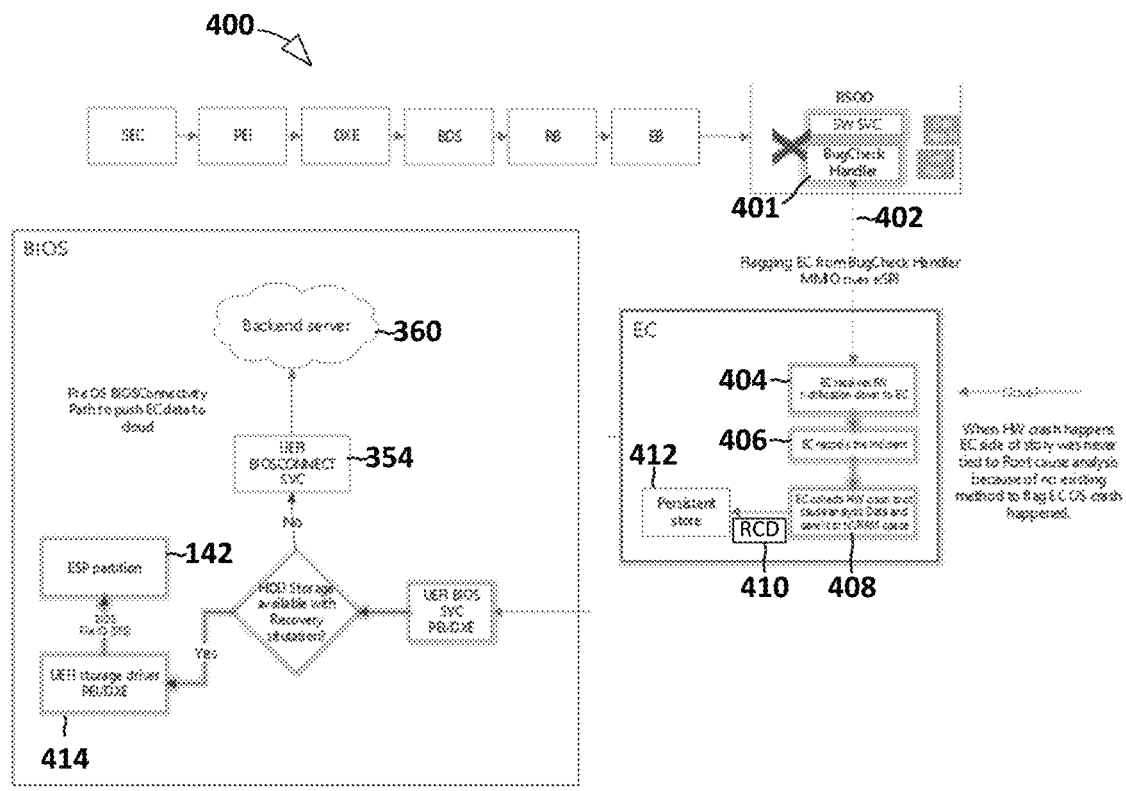
Figure 5:
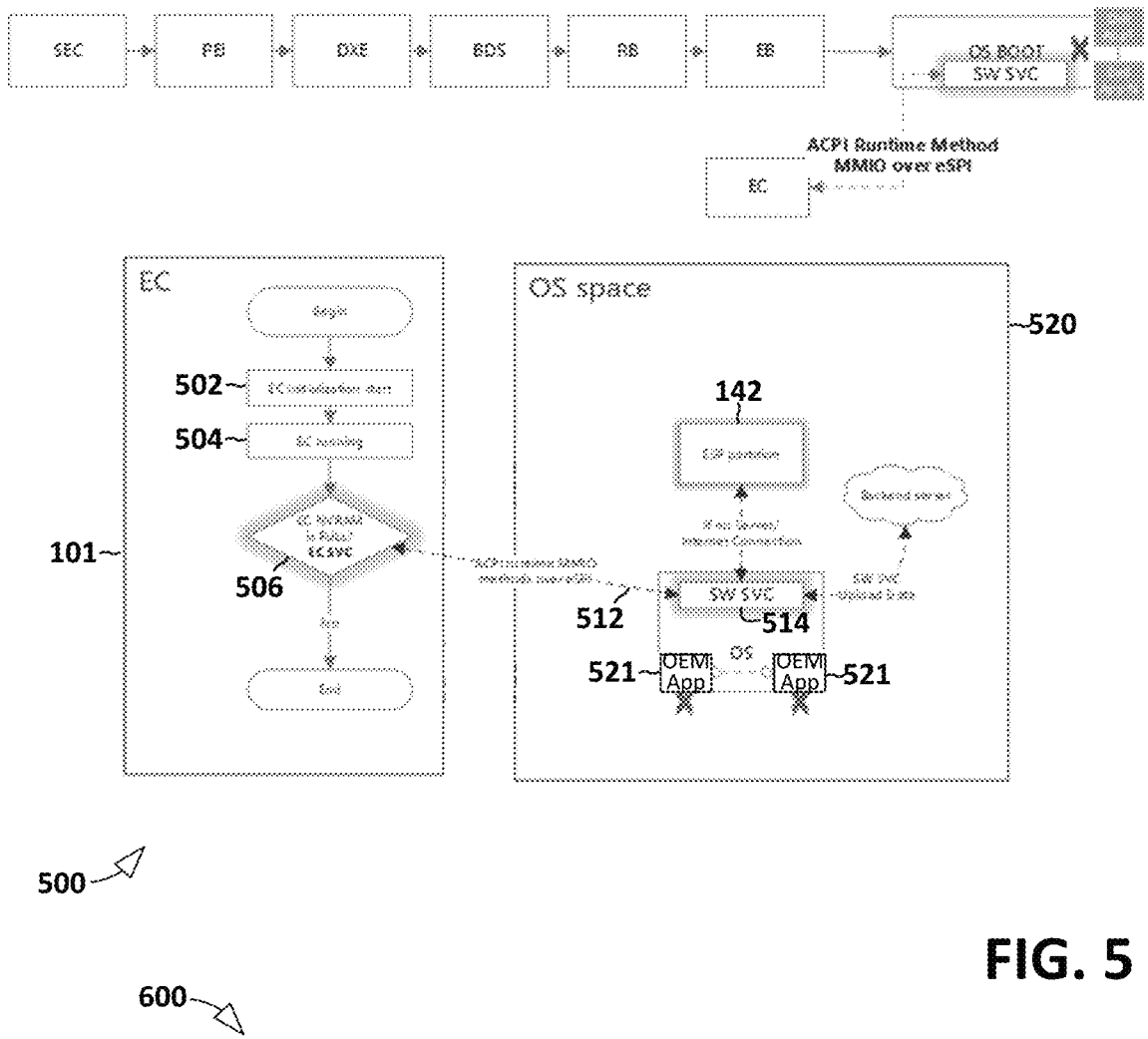

As indicated in the preceding remarks, intelligent offloading of EC telemetry data may be implemented or invoked following the detection of an anomalous condition or triggering event. Anomalous conditions may include host system configurations or operational states that trigger an error signal, exception, fault, interrupt, or the like. Examples of three such anomalous conditions are illustrated in FIG. 3, FIG. 4 and FIG. 5. The methods illustrated in FIGS. 3-5 include operations performed by EC 101 and BIOS 110. Other implementations of may include operations performed by more and/or different system resources.

Referring now to FIG. 3, a method 300 for offloading of EC telemetry data in accordance with disclosed teachings is depicted in conjunction with a first type of anomalous condition, namely, a preboot error condition.

The method 300 illustrated in FIG. 3 encompasses at least two categories of preboot error conditions, including a first preboot error condition, such as a BIOS no-video condition, that occurs when a host is unable to successfully execute a DXE firmware volume and becomes stuck in PEI phase 304. Another preboot error condition addressed by method 300 is a BIOS no-boot condition, that manifests during a DXE phase 305 or BDS phase 306 of a UEFI BIOS boot sequence 301. In the case of the BIO no-boot condition, a DXE service is substituted for PEI service 340 and a DXE storage driver is substituted for PEI storage driver 348.

The illustrated method 300 begins with an initialization (operation 322) of EC 101. In at least some embodiments, EC 101 may be powered up and initialized independent of the host system CPU and chipset. After a successful initialization of EC 101, EC 101 is up and running in a normal operational state represented in FIG. 3 by operation 324.

EC 101 may then determine (operation 326) whether it received a last boot POST message generated by BIOS 110. If EC 101 determines that it received the last POST message, the illustrated method 300 terminates, i.e., there is no anomalous condition attributable to a preboot error. If, however, EC 101 determines that it did not receive the last BIOS boot POST message, the method 300 illustrated in proceeds to determine (operation 328) whether EC-resident or EC-accessible NVRAM is full or near full, i.e., has less than a specified threshold level of unallocated or otherwise available storage capacity. If the EC NVRAM is not full or near full, the illustrated method 300 terminates because it is not currently necessary to offload EC data. If, however, EC 101 determines that EC-local storage resources are full or near full, EC 101 prepares contents of EC-managed NVRAM, i.e., EC telemetry data, to be pushed or otherwise sent (operation 330) to a PEI service 340 of BIOS 110. As depicted in FIG. 3, the EC telemetry data may be delivered to PEI server 340 as MBOX packets 331.

After all of the MBOX packets are delivered to PEI service 340, PEI service 340 may then determine (operation 344) whether sufficient host-resident storage is available to store the EC telemetry data. In at least some implementations, operation 344 may determine whether ESP 142 exists using PEI storage driver 348. If ESP 142 exists, then EC 101 offloads its data content to ESP 142. If, during the determination in operation 344, BIOS 110 determines that the ESP 142 does not exist or that the storage is insufficient for the EC telemetry data, the EC telemetry data may be pushed (operation 352) to a cloud based backend storage resource 360 by a BIOS connect service 354 that establishes pre-OS BIOS connectivity path to storage resource 360.

Referring now to FIG. 4, a method 400 for offloading of EC telemetry data in accordance with disclosed teachings is depicted in conjunction with a second type of anomalous condition, namely, a runtime error condition and, more specifically, a runtime BSOD error condition.

When a runtime BSOD occurs, a Host OS bugcheck handler 401 flags EC 101. As depicted in FIG. 4, the runtime BSOD flag is communicated to EC 101 by way of eSPI- MMIO channel 402. In response to receiving (operation 404) the runtime BSOD flag, EC 101 records (operation 406) the incident and collects (operation 408) hardware crash root cause analysis data (RCD) 410 and saves it to a persistent store 412, which may or may not correspond to EC NVRAM 105 (FIG. 1). In this manner, the disclosed process beneficially flags EC 101 following a hardware crash and ties EC telemetry to root cause analysis associated with the hardware crash.

When the next reboot occurs, EC 101 instructs BIOS boot process to pull RCD 410 from persistent store 412 and offloads it to an external store, which, again, may be either ESP 142 via a PEI or DXE UEFI storage driver 414 or, if the system HDD is not available, to backend storage 360 via BIOS connect service 354.

Referring now to FIG. 5, a method 500 for offloading of EC telemetry data in accordance with disclosed teachings is depicted in conjunction with a third type of anomalous condition, namely, a runtime missing driver error condition and, more specifically, a missing driver error condition corresponding to a universal telemetry service driver. Method 500 addresses a condition in which a healthy boot has occurred, EC 101 has been successfully initialized (operation 502) and is running normally (504), including receiving telemetry data and storing the telemetry data in EC-local storage, e.g., EV NVRAM 105 (FIG. 1), but the stored telemetry data in EC 101 is not being retrieved by or pushed out to any external storage. This condition may arise when an end user uninstalls one or more OEM business applications 521 in OS space 520 or performs a clean OS Image install. As depicted in FIG. 5, EC 101 may detect (operation 506) an NVRAM full or substantially fully condition, in which an available capacity of EC NVRAM 105 drops below a predetermined minimum available capacity. The EC 101 may respond, in accordance with the method 500 illustrated in FIG. 5, by leveraging an ACPI runtime method, e.g., eSPI MMIO path 512, to invoke an OS-native software service 514 to offload the locally stored telemetry data to an external store, e.g., ESP 142 or a backend server.

In this situation, EC can use ACPI runtime method such as eSPI MMIO path, then the EC data can be offloaded to the ESP partition or the Persistent Dell platform SW SVC can push the data to the cloud. This situation arises when a customer uninstalls the Dell business applications or performs a clean OS Image install. MMIO path SMI-less operation has a bus width of 256 bytes per data transaction. NVRAM can be offloaded in only 5-6 transactions. This path utilizes existing OS-EC hardening channel. MMIO spec supports Up to 1K byte per transfer.

Figure 6:
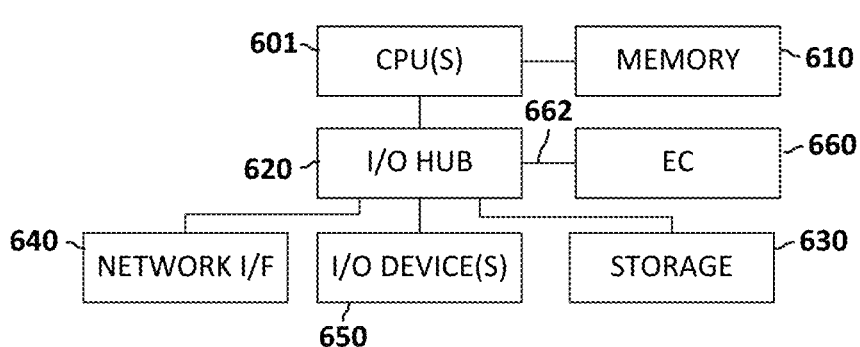
FIG. 6 illustrates an exemplary information handling system suitable for use in conjunction with subject matter disclosed in FIGS. 1-5.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes an EC 660, which may correspond to the EC 101 of FIGS. 1-5. In at least some embodiments, EC 660 is coupled to I/O hub 620 via an eSPI-compliant communication channel 662. EC 660 may provide or support various system management functions and, in at least some implementations, keyboard controller functions. Exemplary system management function that may be supported by EC 660 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 660 may support battery management features to control charging of the battery in addition to switching between the battery and AC adapter as the active power source changes or monitoring the various battery status metrics such as temperature, charge level and overall health. EC 660 may support an ACPI-compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
    a central processing unit (CPU);
    a system memory, accessible to the CPU; and
    an embedded controller (EC), communicatively coupled to the CPU, wherein the EC includes EC memory including executable instructions that, when executed by the EC, cause the EC to perform operations, comprising:
        recording telemetry data responsive to detecting an anomalous event;
        determining that a capacity of EC-accessible storage is insufficient to record all of the telemetry data; and
        responsive to said determining, redirecting the telemetry data to an EC-external data store,
    wherein the anomalous event is selected from:
        a pre-boot error;
        a runtime stop error; and a runtime original equipment manufacturer (OEM)-driver error
wherein the pre-boot error is selected from:
a basic input/output system (BIOS) no-video error; and
a BIOS no-boot error
wherein the pre-boot error is a BIOS no-video error and wherein redirecting the telemetry data comprises:
pushing the telemetry data to a universal extensible firmware interface (UEFI) Pre EFI initialization (PEI) service as a plurality of mail box (MBOX) packets.

2. The information handling system of claim 1, wherein the EC is communicatively coupled to the CPU via an enhanced serial peripheral interface (eSPI) bus.

3. An information handling system, comprising:
a central processing unit (CPU);
a system memory, accessible to the CPU; and
an embedded controller (EC), communicatively coupled to the CPU, wherein the EC includes EC memory including executable instructions that, when executed by the EC, cause the EC to perform operations, comprising:
recording telemetry data responsive to detecting an anomalous event;
determining that a capacity of EC-accessible storage is insufficient to record all of the telemetry data; and
responsive to said determining, redirecting the telemetry data to an EC-external data store;
wherein the anomalous event is selected from:
a pre-boot error;
a runtime stop error; and
a runtime original equipment manufacturer (OEM)-driver error
wherein the pre-boot error is selected from:
a basic input/output system (BIOS) no-video error; and
a BIOS no-boot error;
wherein the pre-boot error is a BIOS no-boot error and wherein redirecting the telemetry data further includes:
pushing the telemetry data to a UEFI PEI service as a plurality of MBOX packets;
instrumenting the PEI service to send the MBOX packets to a driver execution environment (DXE) startup service via a hand off block (HOB);
assembling an HOB list containing telemetry data content; and
offloading the telemetry data content with a UEFI DXE storage driver.

4. A method comprising, comprising:
recording, by an embedded controller (EC) of an information handling system, telemetry data responsive to detecting an anomalous event;
determining that a capacity of EC-accessible storage is insufficient to record all of the telemetry data;
responsive to said determining, redirecting the telemetry data to an EC-external data store;
wherein the anomalous event is selected from:
a pre-boot error;
a runtime stop error; and
a runtime original equipment manufacturer (OEM)-driver error
wherein the anomalous condition comprises a runtime stop error and wherein the operations further include:
flagging the EC, by a bugcheck handler of the operating system (OS), via an eSPI-memory-mapped I/O (MMIO) channel;
storing, by the EC, hardware context root cause data to persistent storage; and
during a next boot sequence, configuring a BIOS boot process to pull data from the EC and offload the data to the EC-external storage.

5. The method of claim 4, wherein the EC is communicatively coupled to a central processing unit (CPU) via an enhanced serial peripheral interface (eSPI) bus.

6. The method of claim 4, wherein the runtime OEM-driver error comprises an error associated with an OEM-specific unified telemetry service driver.

7. The method of claim 6, wherein directing the telemetry data comprises directing the telemetry data via an Advanced Configuration and Power Interface (ACPI) runtime method.

8. The method of claim 7, wherein the ACPI runtime method comprises an eSPI-MMIO path.

* * * * *